US012217538B2

(12) United States Patent
Vardimon et al.

(10) Patent No.: US 12,217,538 B2
(45) Date of Patent: Feb. 4, 2025

(54) AUTOMOMOUS VALIDATION OF PROPER MASK WEARING

(71) Applicant: CORSIGHT.AI, Tel Aviv (IL)

(72) Inventors: Ran Vardimon, Tel Aviv (IL); Yarden Yaniv, Tel Aviv (IL); Matan Noga, Tel Aviv (IL); Gadi Piran, Upper Saddle River, NJ (US); Kirill Dyagilev, Jersey City, NJ (US)

(73) Assignee: CORSIGHT.AI, Tel Aviv (IL)

( * ) Notice: Subject to any disclaimer, the term of this patent is extended or adjusted under 35 U.S.C. 154(b) by 162 days.

(21) Appl. No.: 17/380,004

(22) Filed: Jul. 19, 2021

(65) Prior Publication Data
US 2022/0019766 A1 Jan. 20, 2022

Related U.S. Application Data

(60) Provisional application No. 62/705,869, filed on Jul. 19, 2020.

(51) Int. Cl.
| | | |
|---|---|---|
| G06V 40/16 | (2022.01) | |
| G06N 3/08 | (2023.01) | |
| G06T 7/20 | (2017.01) | |
| G06V 10/44 | (2022.01) | |

(52) U.S. Cl.
CPC .......... *G06V 40/171* (2022.01); *G06N 3/08* (2013.01); *G06T 7/20* (2013.01); *G06V 10/44* (2022.01)

(58) Field of Classification Search
CPC .... G06V 40/171; G06V 40/165; G06V 20/53; G06V 10/44; G06N 3/08; G06N 3/045; G06N 3/00; G06T 7/20
See application file for complete search history.

(56) References Cited

U.S. PATENT DOCUMENTS

| | | | |
|---|---|---|---|
| 11,361,445 B2 * | 6/2022 | Lev | ........................ G06T 7/136 |
| 2022/0012894 A1 * | 1/2022 | Lev | ...................... G06V 40/166 |

FOREIGN PATENT DOCUMENTS

CN 111428559 A * 7/2020

OTHER PUBLICATIONS

"Abhiteja Konda et. al., Aerosol Filtration Efficiency of Common Fabrics Used in Respiratory Cloth Masks, ACS Nano 2020, 14, 6339-6347, Apr. 2020" (Year: 2020).*
"Andreas Vlachos, Evaluating unsupervised learning for natural language processing tasks, Proceedings of EMNLP 2011, Conference on Empirical Methods in Natural Language Processing, pp. 35-42, Edinburgh, Scotland, UK, Jul. 27-31, 2011. c 2011 Association for Computational Linguistics" (Year: 2011).*
"Athnasios Nikolaidis et. al., Facial feature extraction and pose determination, Pattern Recognition 33 (2000) 1783-1791, Department of Informatics" (Year: 2000).*
"Bao-guo Yao et al., Impact of structural features on dynamic breathing resistance of healthcare face mask, College of Mechatronics Engineering, Science of Total Environment 689 [2019], 743-753" (Year: 2019).*
"Khairul Anuar Ishak et. al., A Face Detection and Recognition System for Intelligent Vehicles, Information Technology Journal 5 [3], 507-515, 2006" (Year: 2006).*

(Continued)

*Primary Examiner* — Andrae S Allison
*Assistant Examiner* — Phuong Hau Cai
(74) *Attorney, Agent, or Firm* — Reches Patents

(57) ABSTRACT

Systems, and method and computer readable media that store instructions for.

20 Claims, 3 Drawing Sheets

(56) References Cited

OTHER PUBLICATIONS

"Susan Miller, Facial Recognition Adapts to a Mask-Wearing Public, GCN, Cybersercurity, May 2020" (Year: 2020).*

"Hajin et. al., Learning Facial Expressions with 3D Mesh Convo9lutional Neural Network, Nov. 2018, ACM Transactions on Intelligent Systems and Technology, vol. 10, Issue 1, pp. 1-22" (Year: 2018).*

"Michael Opitz et. al., Grid Loss: Detecting Occluded Faces, Sep. 2016, Part of the book series: Lecture Notes in Computer Science, vol. 9907" (Year: 2016).*

* cited by examiner

AUTOMOMOUS VALIDATION OF PROPER MASK WEARING

BACKGROUND

Infectious diseases may spread through several routes of transmission. Oral transmission may involve spreading of microbes through saliva. The COVID-19 pandemic is an example of an infectious disease that spreads through saliva.

The spread of COVID-19, as well as other infectious diseases that spread through saliva may be controlled or at least slowed down by wearing masks.

It is of paramount importance that masks are worn properly—according to one of more safety rules. A mask is worn in a safety rule compliant manner when (a) the coverage of the mask is proper, and (b) the mask material is adapted to prevent progress of the saliva droplets.

Vast number of persons must wear masks properly in various situations—for example when using public transportation, when moving in public spaces, when shopping, and the like. Manual enforcement of properly wearing masks is not practical and very inaccurate.

There is a growing need to provide an efficient and cost effective solution for checking whether people are wearing masks properly.

SUMMARY

There may be provided systems, methods and computer readable medium as illustrated in the specification.

BRIEF DESCRIPTION OF THE DRAWINGS

The embodiments of the disclosure will be understood and appreciated more fully from the following detailed description, taken in conjunction with the drawings in which.

DESCRIPTION OF EXAMPLE EMBODIMENTS

Figure 1:
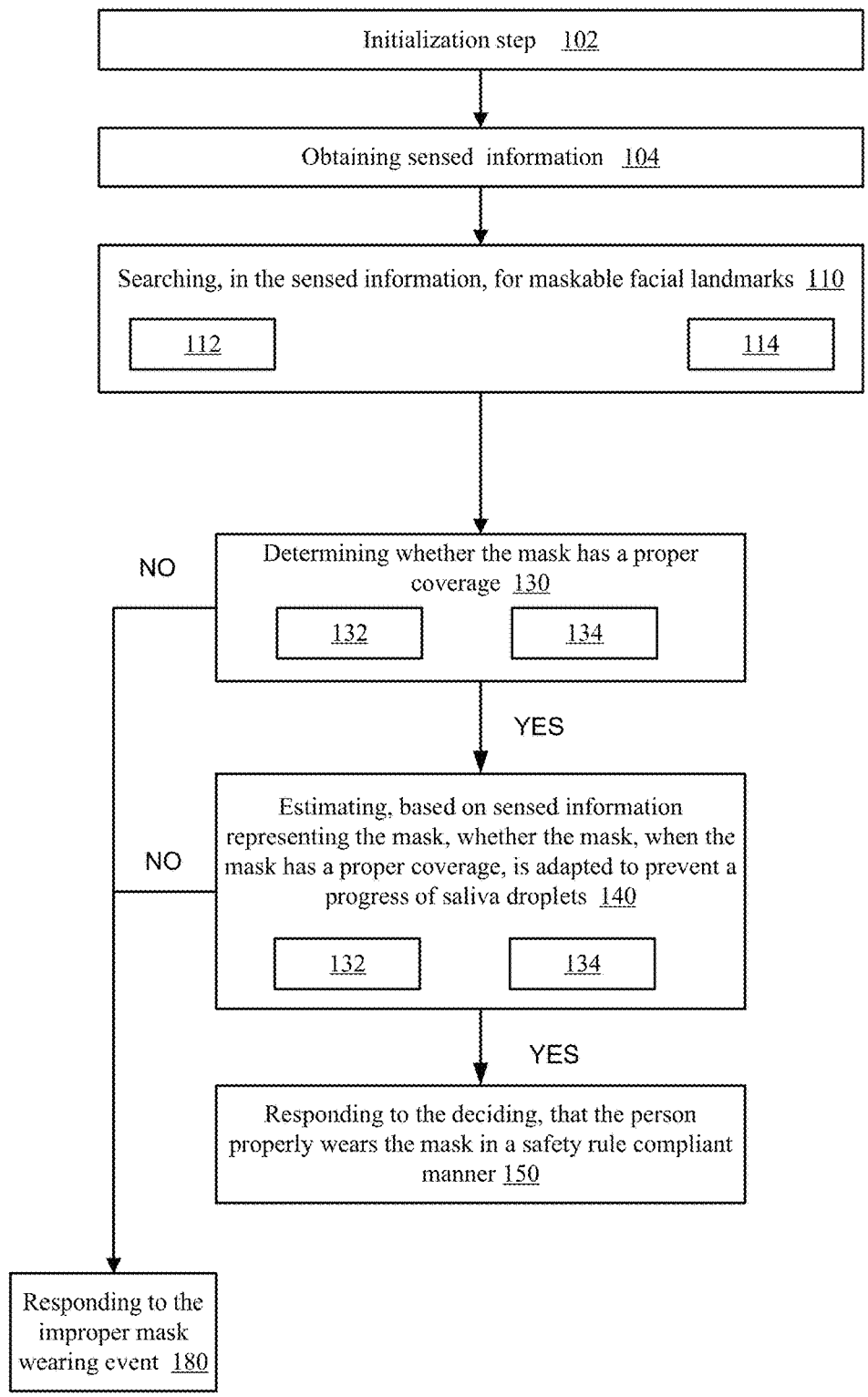
FIG. 1 illustrates an example of a method.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a device or system capable of executing the method and/or to a non-transitory computer readable medium that stores instructions for executing the method.

Any reference in the specification to a system or device should be applied mutatis mutandis to a method that may be executed by the system, and/or may be applied mutatis mutandis to non-transitory computer readable medium that stores instructions executable by the system.

Any reference in the specification to a non-transitory computer readable medium should be applied mutatis mutandis to a device or system capable of executing instructions stored in the non-transitory computer readable medium and/or may be applied mutatis mutandis to a method for executing the instructions.

Any combination of any module or unit listed in any of the figures, any part of the specification and/or any claims may be provided.

The specification and/or drawings may refer to an image. An image is an example of a media unit. Any reference to an image may be applied mutatis mutandis to a media unit. A media unit may be an example of sensed information unit. Any reference to a media unit may be applied mutatis mutandis to sensed information. The sensed information may be sensed by any type of sensors- such as a visual light camera, or a sensor that may sense infrared, radar imagery, ultrasound, electro-optics, radiography, LIDAR (light detection and ranging), etc.

The specification and/or drawings may refer to a processor. The processor may be a processing circuitry. The processing circuitry may be implemented as a central processing unit (CPU), and/or one or more other integrated circuits such as application-specific integrated circuits (ASICs), field programmable gate arrays (FPGAs), full-custom integrated circuits, etc., or a combination of such integrated circuits.

Any combination of any steps of any method illustrated in the specification and/or drawings may be provided.

Any combination of any subject matter of any of claims may be provided.

Any combinations of systems, units, components, processors, sensors, illustrated in the specification and/or drawings may be provided.

The analysis of content of a media unit may be executed by generating a signature of the media unit and by comparing the signature to reference signatures. The reference signatures may be arranged in one or more concept structures or may be arranged in any other manner. The signatures may be used for object detection or for any other use.

There may be provided a method, system and a non-transitory computer readable medium for autonomous validation of a safety rule compliant wearing of a mask, the method may include various parameters including the coverage of the mask (whether is it worn properly) and whether the mask itself (for example its material(s), its structure, its density or any other parameter of the mask) can prevent progress of the saliva droplets.

FIG. 1 illustrates an example of method 100.

Method 100 may start by initialization step 102. The initialization step may include, for example, receiving reference information regarding the proper mask coverage, which masks are adapted to prevent a progress of saliva droplets.

Initialization step 102 may be followed by step 104 of obtaining sensed information.

The sensed information may be visual light information, infrared information, near infrared information, and the like. The sensed information may be an image, multiple images, a video stream, and the like.

The sensed information may be sensed by various sensors and may be sensed in different environments and/or situations. For example—the sensed information may be captured by an image sensor of a vehicle, and wherein the person is a passenger of the vehicle. This will allow drivers (such as taxi drivers of other public transportation drivers) to monitor their passengers.

Step 104 may be followed by step 110 of searching, in the sensed information, for maskable facial landmarks.

A maskable facial landmark is a facial landmark that must be masked when properly wearing a mask. For example—the nose and the mouth may be regarded as maskable facial landmarks. Yet for another example—some masks may also require covering the chin—and the chin may be regarded (in some cases) as a maskable facial landmark.

Step 110 may include step 112 of determining a gaze direction of the person, and continuing with the searching only when determining, based on the gaze direction, that at least one face landmark is within a field of view of a sensor that senses the sensed information.

Step 112 may include estimating an orientation of a person's head to verify that the person faces the camera.

Step 110 may include step 114 of searching for the maskable facial landmarks in areas of the sensed information in which the maskable facial landmarks are expected to appear. For example—if sensing a face of a person—then the maskable facial landmarks should appear within the face.

Step 110 may be followed by step 130 of determining whether the mask has a proper coverage. A proper coverage may result in having the maskable facial landmarks masked by the mask.

Step 130 may include step 132 of identifying a type of the mask, and wherein a definition of what amount to a maskable facial landmark is dependent on the type of the mask.

Step 130 may include step 134 of determining that the mask has the proper coverage comprises searching for at least one maskable facial landmarks within a region that corresponds to the face of the person.

Step 130 may be executed using deep learning based localized features describing whether each location contains a face part or not. Localized features can be calculated as: (a) 2D grid of the face, and/or (b) features for specific face regions (e.g. nose, mouth, chin).

These features can be extracted by (a) using a convolutional neural network (CNN) pre-trained for learning facial recognition features to extract a 3D grid of activations that are obtained as output of one of the convolutional layers, (b) Obtaining such activations maps for multiple faces, in which occlusion augmentations are imposed on the faces on random locations (e.g. hide grid points (1,3), (3,5), etc with a black cell or a random image), (c) training a classifier (e.g. LogisticRegression) for each grid point that predict whether the grid point is occluded or not.

Alternatively, it is possible to train a classifier per face region of interest (mouth/nose/chin) to determine whether it is occluded or not.

It is also possible to avoid using a classifier, and extract binarized signatures for each region/or grid cell, and use similarity matching in relation to a set of signatures obtained from occluded/non-occluded regions to determine whether the face region is occluded.

If the mask does not have a proper coverage (one or more maskable facial landmarks are not masked) then step 130 is followed by step 180 of responding to the improper mask wearing event. Step 180 may include updating a database, generating an alert, transmitting an alert, notifying the police and/or the health ministry, and the like.

If the mask does have a proper coverage the step 130 may be followed by step 140 of estimating, based on sensed information representing the mask, whether the mask, when the mask has a proper coverage, is adapted to prevent a progress of saliva droplets.

If determining that the mask, when the mask has the proper coverage, is not adapted to prevent the progress of saliva droplets then step 140 may be followed by step 180.

If determining that the mask, when the mask has the proper coverage, is not adapted to prevent the progress of saliva droplets then the person properly wears the mask in a safety rule compliant manner This is because the mask has a proper coverage and is adapted to prevent progress of the saliva droplets. In this case step 140 may be followed by step 150 of responding to the deciding, that the person properly wears the mask in a safety rule compliant manner Step 150 may include updating a database, generating an alert, transmitting an alert, notifying the police and/or the health ministry, and the like.

It should be noted that steps 140 and 130 may be executed in parallel—and step 140 may be executed prior to step 130.

In any case step 150 will include responding to the deciding, that the person properly wears the mask in a safety rule compliant manner only when (a) the mask has a proper coverage, and (b) the mask is adapted to prevent progress of the saliva droplets.

Step 110 may include generating signatures of the sensed information. The signatures may include one or more signatures of at least a part of the mask.

Step 140 may include step 142 of comparing the signature of at least a part of the mask to reference signatures of masks that once have a proper coverage, are marked as being adapted to prevent the progress of saliva droplets.

The reference signatures may belong to concept structures. The concept structures are generated in an unsupervised manner Any number of images of masks (including a vast number of images) may be processed in an unsupervised manner to generate the concept structures. A concept structure may include a cluster of images or any type of information regarding one or more masks that may share a certain property. Non-limiting example of cluster structures, and signatures are illustrated in U.S. patent application Ser. No. 16/544,940 filing date Aug. 20, 2019 which is incorporated herein by reference.

At least some of masks are manually marked as being adapted to prevent the progress of saliva droplets when they have a proper coverage. For each such mask, other masks included in the same concept structure are also deemed to be adapted to prevent the progress of saliva droplets when they have a proper coverage.

The generation of the concept structures may be executed on vast number of images and the number of concept structures generated by the unsupervised process may be a small fraction of the number of images. Accordingly—the effort associated with manually tagging is insignificant in relation to the effort related to the generation of the concept structures.

Step 140 may be based on generating a database of materials (of masks) used to cover faces.

The generating of the database may include:

Obtaining features for a large number of face images, including faces with masks, scarfs, hijabs, occluded by hand or other typical occlusion. The database may be generated in a supervised or unsupervised manner For example, it is possible to use face detection and the occlusion detection method mentioned above to automatically gather a large set of occluded faces from video streams or image albums.

Clustering the signatures of areas around expected locations of mouth and nose to get clusters of possible types of covering materials, using any clustering algorithm—for example a clustering algorithm that may use a similarity metric such as cosine similarity. Note that since the number of clusters is not known in advance it is possible to rerun clustering several times until obtaining a distribution that seems reasonable by human inspection.

Manually labeling the clusters (labeling effort is very limited since the number of groups is small) and selecting the clusters containing masks, in order to get a large number of examples of different types of masks.

Using the selected clusters create concept structures of acceptable mask materials. When a query occluded face is obtained, it is possible to determine whether it is a mask by finding the cluster (or concept structure) that has a highest similarity to the signature obtained from the occluded region, for example by finding the cluster that's center has highest similarity score to the signature. If binarized signatures are used, it is possible to significantly enhance the concept structures ability to distinguish between occlusion types.

Creating one or more concept structures of materials for masks not adapted to prevent progress of the saliva droplets.

The sensed information may be obtained over a period of time. It will be processed by one or more iterations of steps 110, 120, 130, 140 and 150 and 180.

Step 130 and/or 140 may include searching for changes in the coverage of the mask during the period of time.

For example—step 130 may include evaluating whether a movement of a part of the mask follows a breathing of the person. If so—this is an indication that the mask has a proper coverage.

The pseudo-code provides various example for executing one or more steps of method 100.

Routine "Is masked properly in this frame" (proper/not proper/unknown)

Step 1: Detect the presence of a face or head in the
 a. No face/head detected→mask status unknown, stop;
 b. Proceed otherwise Step 2: Detect gaze of this face or head (using standard techniques, outside of the scope of this patent)
 a. Either nose or mouth area or both are not in the field of view→mask status unknown, stop;
 b. Proceed otherwise (both mouth and nose area are in the field of view)

Step 3: Initial analysis of whether the person is properly masked:
 a. Use nose and mouth concepts to detect whether they are visible: either is seen→mask status not proper (failed Criterion 1), stop;
 b. Proceed otherwise (both nose and mouth are not visible)

Step 4: Mask type classification: use pixels in the nose and mouth area (estimated from gaze) and beyond if necessary be to get a sample of pixels on the presumed mask and classify its type by matching their signature to "mask concepts"
 a. If mask pixels signature matches to the concept of improper materials (e.g., a fine grained mesh or a human hand)→mask status not proper (failed Criterion 2), stop
 b. If mask pixels signature does not match to any of the concepts of proper materials→mask status not proper (failed Criterion 2), stop
 c. Otherwise, continue
 d. Infer if masks of the detected type are required to cover facial landmarks in addition to mouth and nose.
 e. If not, proceed to step
 f. If there are such landmarks, repeat steps 2 and 3 for these additional landmarks. Namely,
  1. Check using gaze that these additional landmarks are in the camera's field of view. If not, mask status is unknown, stop.
  2. Otherwise, use concepts for these landmarks to validate that they are not visible, i.e., covered by a mask and this mask is of proper material. If either condition fails, mask status is not proper (failed Criterion 2)

Step 5: Declare that the mask status is proper
 If you did not stop before step 5, then a person wears a mask
 The orientation of a person's face is such that all facial landmarks relevant for the decision "properly masked or not" are visible.
 This mask is of proper material (criterion 2 is satisfied)
 All maskable landmarks for this particular mask are covered. (criterion 1 is satisfied)

Routine "Is masked properly according to video stream" (proper/not proper/unknown):
 1. This routine runs "Is masked properly in this frame" routine on each new frame of the video and saves the results.
 2. If person wears the mask properly in the current frame, then mask status is proper, stop;
 3. If person does not wear the mask properly in the current frame, then mask status is not proper, stop;
 4. If the mask status in the current frame is "unknown", check single-frame mask status of recent previous frames (recency is user-defined, e.g., 1 sec, 10 sec). If the most recent known status is "proper" return mask status is proper. If the most recent known status is "not proper" return mask status is not proper.
 5. The reaction to the scenario when the mask status in the current and recent frame is unknown is user-defined.

It should be known the mentioned above routines may use trained neural network

The training may involve using one or more techniques for face/head detection and gaze/face orientation estimation.

Using publicly available collections of face images with annotated nose/mouth locations, concept structures of nose and mouth are generated that are used in step 3 of "Is masked properly in this frame" routine (aka, "initial analysis of whether the person is properly masked").

A large collection of annotated face images can be used to find images of masked people. This is done using steps similar to step 2 and step 3 in "Is masked properly in this frame" routine: Using gaze estimation method, check if either nose or mouth are in the field of view of this image.

If not, discard the image. If either nose or mouth is in the field of view but is not visible (i.e., it is covered) categorize this image as "(partially) masked face". Otherwise, discard these images.

Images of (partially) mask faces may be clustered by the mask type and mask material:

Index "(partially) masked face" images according to pixels in the masked areas and cluster them according to signature similarity.

Most clusters may contain images of people wearing the same type of mask or masks made of similar materials. This allows to gather a large number of examples of a particular mask type/material in an unsupervised manner.

Using these clusters, concept clusters can be generated for different mask types, mask materials, and non-mask coverings (e.g., a hand).

Figure 2:
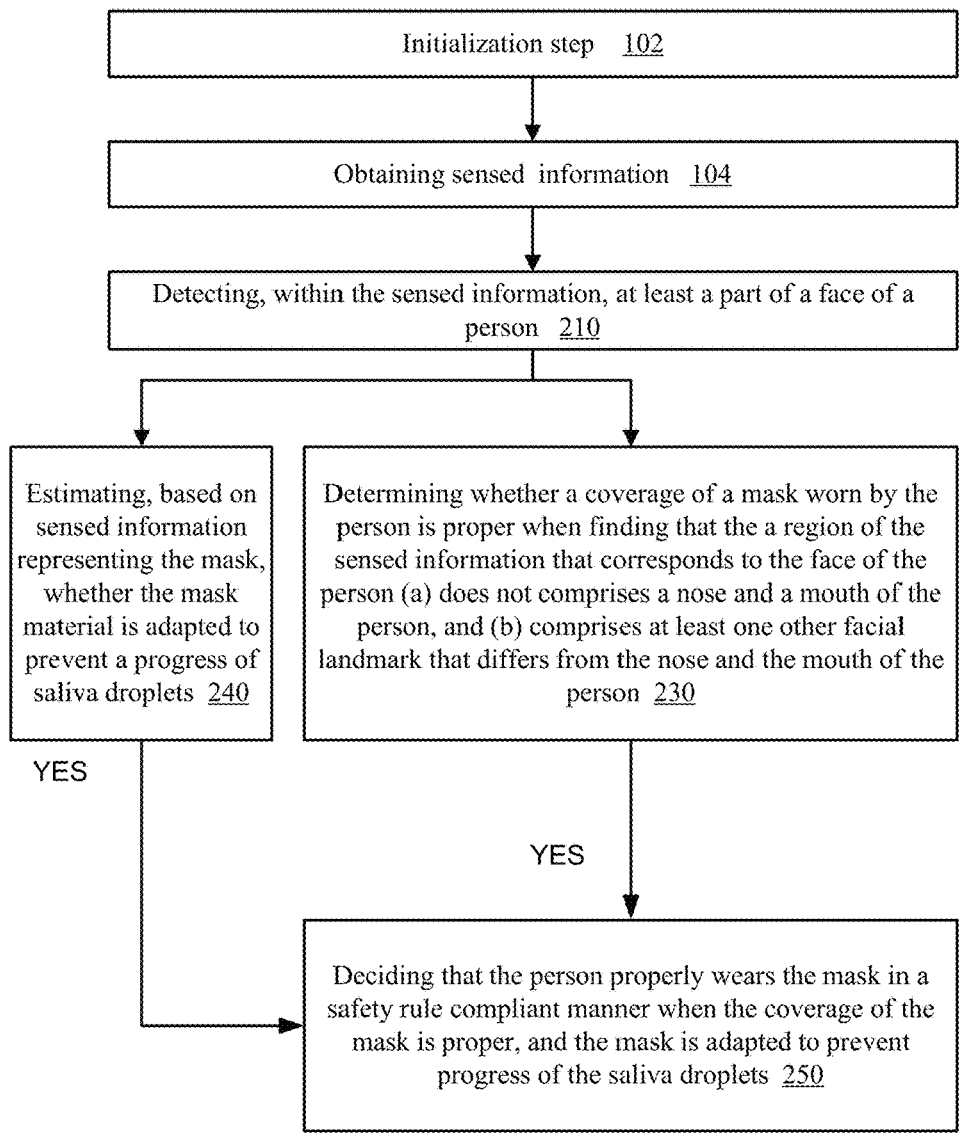
FIG. 2 illustrates an example of a method.

FIG. 2 illustrates an example of method 200 for autonomous validation of a safety rule compliant wearing of a mask.

Method 200 may start by initialization step 102. The initialization step may include, for example, receiving reference information regarding the proper mask coverage, which masks are adapted to prevent a progress of saliva droplets.

Initialization step 102 may be followed by step 104 of obtaining sensed information.

Step 104 may be followed by step 210 of detecting, within the sensed information, at least a part of a face of a person.

Step 210 may be followed by step 230 of determining whether a coverage of a mask worn by the person is proper when finding that the a region of the sensed information that corresponds to the face of the person (a) does not comprises a nose and a mouth of the person, and (b) comprises at least one other facial landmark that differs from the nose and the mouth of the person.

Method 200 may also include step 240 of estimating, based on sensed information representing the mask, whether the mask material is adapted to prevent a progress of saliva droplets.

Steps 230 and 240 may be followed by step 250 of deciding, that the person properly wears the mask in a safety rule compliant manner when the coverage of the mask is proper, and the mask is adapted to prevent progress of the saliva droplets.

Figure 3:
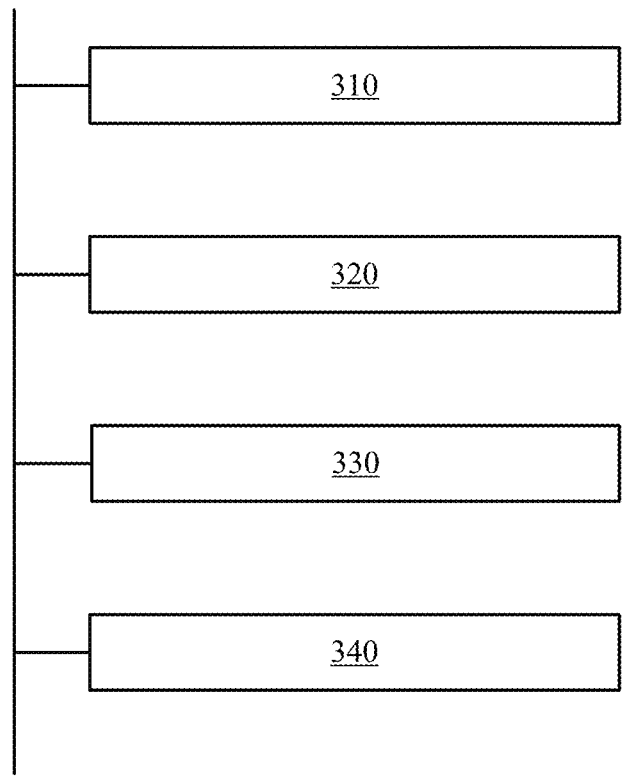
FIG. 3 illustrates an example of a computerized system.

FIG. 3 illustrates an example of a computerized system 300.

Computerized system 300 may include a sensed information processor 310, a memory unit 320, a decision unit 330 and an input output unit 340.

The sensed information processor 310 may be configured to search for maskable facial landmarks, and/or to detect at least a part of a face of a person.

The sensed information processor 310 and/or the decision unit 330 may be configured to determine whether the coverage of the mask is proper and/or to estimate whether the mask material is adapted to prevent a process of saliva droplets and/or to determine whether the mask (when the mask has a proper coverage) is adapted to prevent a progress of saliva droplets, and/or to determine whether the mask is worn in a safety rule compliant manner Any concept structure and/or sensed information and/or any information required during the execution of method 100 and/or method 200 may be stored in memory unit 320 and/or any external memory or storage unit.

Input output unit 340 may receive and/or output information (for example receive sensed information), and/or alerts and/or reports, and the like. Input output unit 340 may be any suitable communications component such as a network interface card, universal serial bus (USB) port, disk reader, modem or transceiver that may be operative to use protocols such as are known in the art to communicate either directly, or indirectly, with other elements of system 300 and/or other entities.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

It is appreciated that various features of the embodiments of the disclosure which are, for clarity, described in the contexts of separate embodiments may also be provided in combination in a single embodiment. Conversely, various features of the embodiments of the disclosure which are, for brevity, described in the context of a single embodiment may also be provided separately or in any suitable sub-combination.

It will be appreciated by persons skilled in the art that the embodiments of the disclosure are not limited by what has been particularly shown and described hereinabove. Rather the scope of the embodiments of the disclosure is defined by the appended claims and equivalents thereof.

We claim:

1. A method for autonomous validation of a safety rule compliant wearing of a mask, the method comprises:
    searching, by a processing circuit and in sensed information, for maskable facial landmarks;
    determining that a mask has a proper coverage when finding that all the maskable facial landmarks are masked;
    wherein the determining is executed by extracting localized facial recognition features by (a) using a convolutional neural network (CNN) pre-trained for learning the facial recognition features to extract a 3D grid of activations that are obtained as output of one of the convolutional layers as an activations map, (b) obtaining such activations maps for multiple faces, in which occlusion augmentations are imposed on the faces on random locations, and (c) training a classifier for each grid point of the 3D grid that predicts whether the grid point of the 3D grid is occluded or not;
    estimating, based on sensed information representing the mask, whether the mask, when the mask has the proper coverage, is adapted to prevent a progress of saliva droplets; deciding, that the person properly wears the mask in a safety rule compliant manner when the mask has the proper coverage and is adapted to prevent progress of the saliva droplets; and responding to the deciding by populating a database and transmitting an alert.

2. The method according to claim 1 wherein the estimating comprises comparing a signature of at least a part of the mask to reference signatures of masks that once have a proper coverage, are marked as being adapted to prevent the progress of saliva droplets.

3. The method according to claim 2 wherein the reference signatures belong to concept structures, wherein the concept structures are generated in an unsupervised manner, wherein at least some of masks are manually marked as being adapted to prevent the progress of saliva droplets when they have a proper coverage.

4. The method according to claim 1 wherein the maskable facial landmarks comprise a mouth and a nose.

5. The method according to claim 1 comprising identifying a type of the mask, and wherein a definition of what amount to a maskable facial landmark is dependent on the type of the mask.

6. The method according to claim 1 wherein the determining that the mask has the proper coverage comprises searching for at least one maskable facial landmarks within a region that corresponds to the face of the person.

7. The method according to claim 1 wherein the searching is preceded by determining a gaze direction of the person and continuing to the searching only when determining, based on the gaze direction, that at least one face landmark is within a field of view of a sensor that senses the sensed information.

8. The method according to claim 1 wherein the sensed information comprises images acquired over a period of time, wherein the method comprises performing the searching, determining, estimating and deciding during the period of time.

9. The method according to claim 8 comprising searching for changes in the coverage of the mask during the period of time; wherein the deciding is responsive to the changes.

10. The method according to claim 8 comprising evaluating whether a movement of a part of the mask follows a breathing of the person.

11. The method according to claim 1 wherein the sensed information is captured by an image sensor of a vehicle, and wherein the person is a passenger of the vehicle.

12. The method according to claim 1 comprising searching for a non-maskable facial landmark that may be unmasked when the mask has the proper coverage.

13. A method for autonomous validation of a safety rule compliant wearing of a mask, the method comprises:
    detecting, by a processing circuit and within sensed information, at least a part of a face of a person;
    determining that a coverage of a mask worn by the person is proper when finding that the a region of the sensed information that corresponds to the face of the person (a) does not comprises a nose and a mouth of the person, and (b) comprises at least one other facial landmark that differs from the nose and the mouth of the person; wherein the determining is executed by extracting localized facial recognition features by (a)

using a convolutional neural network (CNN) pretrained for learning the facial recognition features to extract a 3D grid of activations that are obtained as output of one of the convolutional layers as an activations map, (b) obtaining such activations maps for multiple faces, in which occlusion augmentations are imposed on the faces on random locations, and (c) training a classifier for each grid point of the 3D grid that predicts whether the grid point of the 3D grid is occluded or not;

estimating, based on sensed information representing the mask, whether the mask material is adapted to prevent a progress of saliva droplets; and deciding, that the person properly wears the mask in a safety rule compliant manner when the coverage of the mask is proper, and the mask is adapted to prevent progress of the saliva droplets; and responding to the deciding by populating a database and transmitting an alert.

14. A non-transitory computer readable medium for autonomous validation of a safety rule compliant wearing of a mask, the non-transitory computer readable medium that stores instructions for:

searching, by a processing circuit and in sensed information, for maskable facial landmarks;

determining that a the mask has a proper coverage when finding that all the maskable facial landmarks are masked; wherein the determining is executed by extracting localized facial recognition features by (a) using a convolutional neural network (CNN) pretrained for learning the facial recognition features to extract a 3D grid of activations that are obtained as output of one of the convolutional layers as an activations map, (b) obtaining such activations maps for multiple faces, in which occlusion augmentations are imposed on the faces on random locations, and (c) training a classifier for each grid point of the 3D grid that predicts whether the grid point of the 3D grid is occluded or not;

estimating, based on sensed information representing the mask, whether the mask, when the mask has a the proper coverage, is adapted to prevent a progress of saliva droplets;

deciding, that the person properly wears the mask in a safety rule compliant manner when the mask has a the proper coverage and is adapted to prevent progress of the saliva droplets; and responding to the deciding by populating a database, transmitting an alert.

15. The non-transitory computer readable medium according to claim 14 wherein the estimating comprises comparing a signature of at least a part of the mask to reference signatures of masks that once have a proper coverage, are marked as being adapted to prevent the progress of saliva droplets.

16. The non-transitory computer readable medium according to claim 15 wherein the reference signatures belong to concept structures, wherein the concept structures are generated in an unsupervised manner, wherein at least some of masks are manually marked as being adapted to prevent the progress of saliva droplets when they have a proper coverage.

17. The non-transitory computer readable medium according to claim 14 wherein the maskable facial landmarks comprise a mouth and a nose.

18. The non-transitory computer readable medium according to claim 14 that stores instructions for identifying a type of the mask, and wherein a definition of what amount to a maskable facial landmark is dependent on the type of the mask.

19. The non-transitory computer readable medium according to claim 14 wherein the determining that the mask has the proper coverage comprises searching for at least one maskable facial landmarks within a region that corresponds to the face of the person.

20. The non-transitory computer readable medium according to claim 14 wherein the searching is preceded by determining a gaze direction of the person and continuing to the searching only when determining, based on the gaze direction, that at least one face landmark is within a field of view of a sensor that senses the sensed information.

* * * * *